(12) United States Patent
Dickinson (10) Patent No.: US 7,155,854 B2
(45) Date of Patent: Jan. 2, 2007

(54) REUSEABLE LABELING CONSTRUCTIONS FOR CONTAINERS, ALONG WITH CONTAINERS AND METHODOLOGIES UTILIZING THE SAME

(76) Inventor: Kent H. Dickinson, 6228 Water's Edge Dr., Covington, GA (US) 30014

( * ) Notice: Subject to any disclaimer, the term of this patent is extended or adjusted under 35 U.S.C. 154(b) by 0 days.

(21) Appl. No.: 11/160,529

(22) Filed: Jun. 28, 2005

(65) Prior Publication Data

US 2005/0285386 A1 Dec. 29, 2005

Related U.S. Application Data

(63) Continuation-in-part of application No. 10/298,145, filed on Nov. 15, 2002, now Pat. No. 7,013,589, which is a continuation-in-part of application No. 10/170,013, filed on Jun. 10, 2002, which is a continuation-in-part of application No. 09/956,478, filed on Sep. 18, 2001, now Pat. No. 6,737,974.

(51) Int. Cl.
*G09F 3/18* (2006.01)
*B65D 27/04* (2006.01)

(52) U.S. Cl. ............... 40/775; 40/654.01; 383/40; 229/71

(58) Field of Classification Search ............ 40/775, 40/776, 654.01; 383/40; 229/71
See application file for complete search history.

(56) References Cited

U.S. PATENT DOCUMENTS

| | | |
|---|---|---|
| 2,611,369 A * | 9/1952 | Herrick .................. 40/776 |
| 4,044,867 A | 8/1977 | Fisher |
| 4,107,861 A | 8/1978 | Johnson |
| 4,153,090 A * | 5/1979 | Rifkin .................. 383/61.3 |
| 4,465,188 A | 8/1984 | Soroka |
| 4,479,838 A | 10/1984 | Dunsirn et al. |
| 4,494,592 A | 1/1985 | Bonner |
| 4,569,082 A | 2/1986 | Ainsworth et al. |
| 4,771,557 A * | 9/1988 | Bowman .................. 40/771 |
| 4,858,755 A | 8/1989 | Kuivanen |
| 5,025,581 A * | 6/1991 | Polzin .................. 40/776 |
| 5,059,033 A | 10/1991 | Branson |
| 5,217,131 A | 6/1993 | Andrews |
| 5,323,922 A | 6/1994 | Lapoint, Jr. et al. |
| 5,417,790 A | 5/1995 | Petrou |
| 5,547,075 A | 8/1996 | Hoogerwoord |
| 5,628,858 A | 5/1997 | Petrou |
| 5,844,485 A | 12/1998 | Ryan, Jr. |
| 5,845,806 A | 12/1998 | Parchman |
| 5,957,583 A | 9/1999 | DeClements, Jr. et al. |
| 6,139,188 A | 10/2000 | Marzano |
| 6,176,613 B1 | 1/2001 | Chen |
| 6,204,764 B1 | 3/2001 | Maloney |
| 6,224,258 B1 | 5/2001 | Dodson |
| 6,281,795 B1 | 8/2001 | Smith et al. |
| 6,334,537 B1 | 1/2002 | Tepper |

* cited by examiner

*Primary Examiner*—Cassandra Davis
(74) *Attorney, Agent, or Firm*—Timothy J. Martin; Michael R. Henson; John W. Carpenter (57) ABSTRACT

Labeling constructions are provided for use in facilitating the preparation of shipping containers. The labeling constructions are also reusable so that packages can be conveniently shipped between senders and recipients numerous times. Container constructions and methodologies which employ such labeling constructions are also provided.

2 Claims, 10 Drawing Sheets

Fig.9

REUSEABLE LABELING CONSTRUCTIONS FOR CONTAINERS, ALONG WITH CONTAINERS AND METHODOLOGIES UTILIZING THE SAME

BACKGROUND

A fundamental need of commerce-based societies is the transportation of goods from one location to another. The development of various postal systems, first on the national and then on an international basis, established an organized system wherein a carrier for a price would convey a parcel from a sender to a recipient. The service provided by such carriers resulted in increasing demand and expansion of their served customer base. In addition to the governmentally sponsored postal services, private carriers have been organized to transport a wide variety of parcels for paying customers. Such companies include those known as United Parcel Service, Federal Express, DHL, Airborne and Emory, to name a few. The proliferation of such companies demonstrates the increasing need for their services.

In addition to the ordinary demands on the parcel carrier industry, the expansion of Internet commerce already has placed, and is expected to continue to place, increasing demands on the need to ship small parcels from a merchant to a customer. The role of the parcel carrier is becoming increasingly integral to the success or failure of consumer's on-line experience and business in general. Shippers know the importance of having a dependable carrier who ultimately provides dependable service to the end-use customer.

Conventional techniques for shipping parcels between senders and recipients can be inconvenient and result in packing waste. For example, when a parcel is shipped in a container, such as a flexible pouch, a cardboard box or the like, the sender typically creates a label for the container, which includes the recipient's address as well as a return address for the sender. It is quite common, for example, for an individual sender to create a shipping package by packaging the parcel into a container and affixing to the container a sticky label having the appropriate origin and destination address either printed or handwritten thereon. The shipping package may then be taken to a governmentally sponsored postal service where it is weighed and applied with appropriate postage before being shipped to the destination location corresponding to the recipient's address. In similar fashion, a sender may take the parcel to a private carrier where it is packaged and labeled, with the private carrier taking responsibility for shipment.

Another manner of shipping parcels between senders and recipients which is widely used is through the use of containers and labeling constructions which are provided by carriers, such as Federal Express, to their customer base. Here, the sender prepares the shipping package by placing the parcel in a container provided by the private carrier, and creates an appropriate shipping label on a form provided by the private carrier. In the Federal Express system, for example, the shipping label itself is a multi-sheet construction including an original form and a plurality of duplicate forms releasably attached thereto via perforation. Here, the multi-sheet shipping label is filled out to include the appropriate shipping information, as well as desired handling instructions for the carrier. Oftentimes, these forms additionally have areas for including the sender's account number so that charges are billed to an appropriate account, as well as appropriate tracking information utilized by the private carrier. The sender maintains a "sender's copy" of the label before it is either picked up by the carrier or deposited at an appropriate drop-off location, such as a drop-box maintained by the private carrier. In any event, when the shipping package is ultimately ready for shipment, the sender maintains a copy of the shipping label and a duplicate version of the shipping label is sealed within a shipping sleeve that is adhered to the container, whether it be a box, a pouch or the like. There are a variety of other techniques for creating shipping packages which are utilized by individuals, as well as private and governmentally sponsored carriers, so that the above is only a snapshot of the various techniques employed in today's commerce.

A drawback of these illustrative techniques, as well as others employed today, is that the labeling constructions themselves and the containers for the parcels are generally not reusable. As a result, there is much packing waste which is attendant with conventional shipping techniques, which inherently contributes to landfill waste and results in added costs and inconveniences to carriers and customers alike. Accordingly, there remains an increasing need to develop improved techniques to facilitate the preparation of shipping packages through the use of reusable containers and reusable labeling constructions, while at the same time alleviating or reducing these drawbacks.

SUMMARY

Reusable labeling constructions are provided for use with containers that are adapted to receive parcels for shipment to intended recipients. These labeling constructions, along with any appropriate container utilizing them, reduces inconvenience by facilitating the preparation of shipping packages by a sender, while at the same time adding convenience and reducing cost for parcel carriers. Container constructions and methodologies employing the labeling constructions provide other embodiments. In its various forms, the invention is an expansion upon the labeling constructions described in my co-pending application Ser. No. 10/298, 145, filed Nov. 15, 2002.

BRIEF DESCRIPTION OF THE DRAWINGS

FIG. 6b is an exploded partial cross-section (not to scale) of the labeling construction from FIG. 6a;

DETAILED DESCRIPTION OF THE EXEMPLARY EMBODIMENTS

Figure 1:
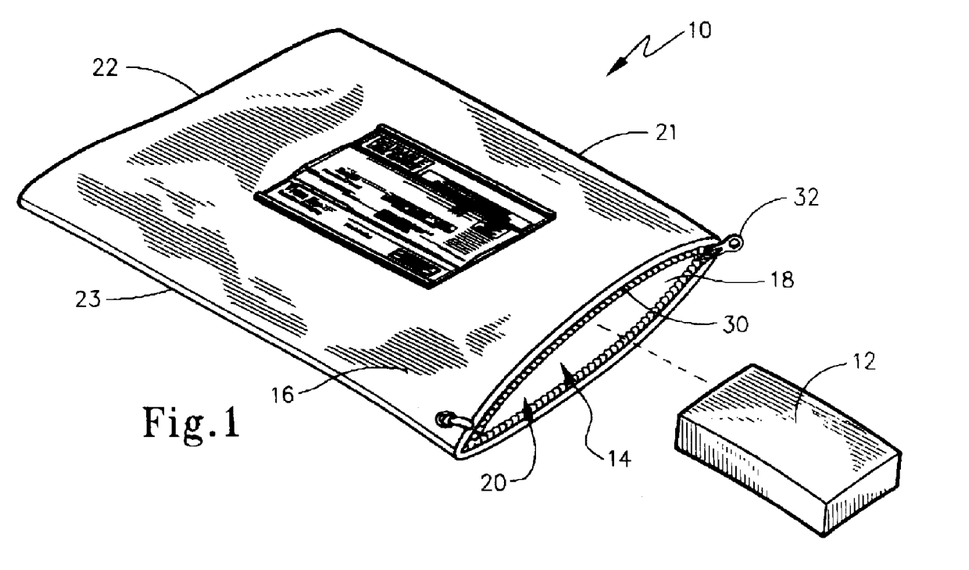
FIG. 1 is a perspective view of a parcel being inserted into a flexible pouch container that provided with a first embodiment of a reusable labeling construction.

With initial reference to FIG. 1, a container 10 is shown in the form of flexible pouch that is adapted to receive a parcel 12 in its interior 14. Container 10 has a front pouch panel 16 and a back pouch panel 18 which are rectangular in shape and joined about three edges 21, 22 and 23 located at the perimeter thereof. Panels 16 and 18 are unattached along a portion of the perimeter to define a mouth 20 through which parcel 12 may be inserted as a received parcel. A zipper 30 includes a pull-tab 32 and is shown in an open position to define a mouth 20 for container 10. The flexible pouch portion of container 10 can assume a variety of configurations, but is preferably constructed as described in my U.S. Pat. No. 6,737,974, issued May 18, 2004, which is incorporated herein by reference.

Front panel 16 of container 10 supports a reusable labeling construction 40 described in more detail in following figures. Reusable labeling construction 40 allows items such as parcel 12 to be conveniently shipped multiple times between senders and recipients while resisting damage to the container during transits. Conveniently also, and as may be best appreciated with reference to FIG. 2, the reusable labeling construction 40 is provided with permanent indicia identifying the actual owner of the container. Being permanent, this provides a "fail-safe" manner of ensuring that the container 10 is ultimately returned to its actual owner, for example, if labels are lost during transit, if the sender(s) and recipient(s) no longer have need for its use, or if the container is misplaced. Representative indicia, generally 50, minimally includes the address 52 of the container's owner. It is to be recognized that the owner of the container may also be one its senders or recipients, or even a third party who may, for example, be in the business of leasing or selling like containers to users.

Figure 2:
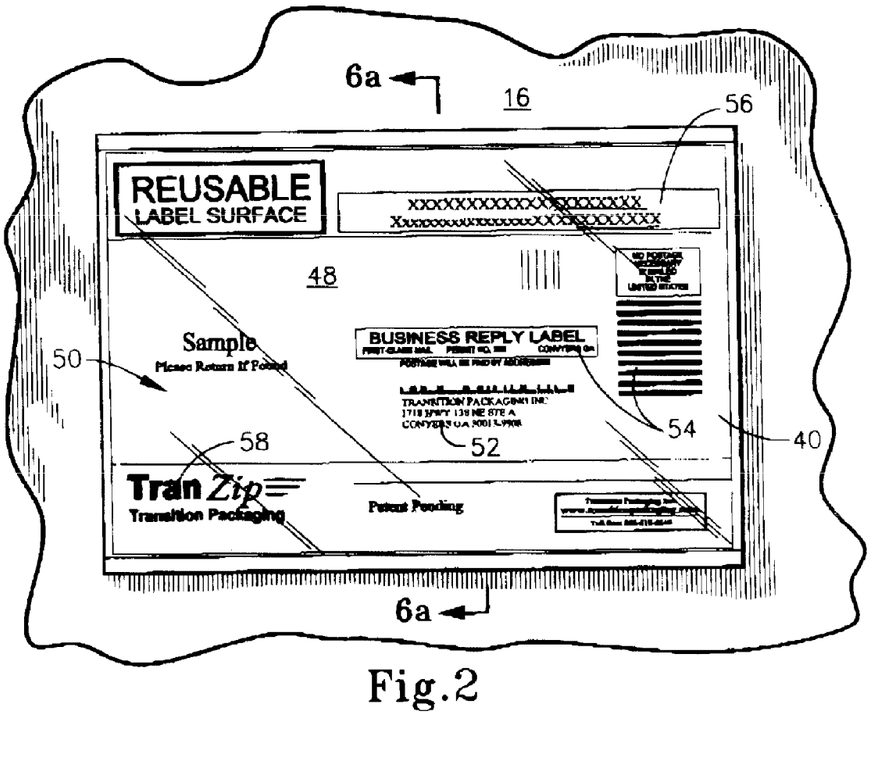
FIG. 2 is a top plan view showing the reusable labeling construction disposed on the top panel of the flexible pouch in FIG. 1.

Indicia 50 may also include other information as shown in FIG. 2, such as pre-paid postage information 54, suitable tracking information 56 presented as barcodes, alphanumeric designations, or the like, and a logo 58 for the owner. Additional indicia as shown may also be provided.

Figure 3:
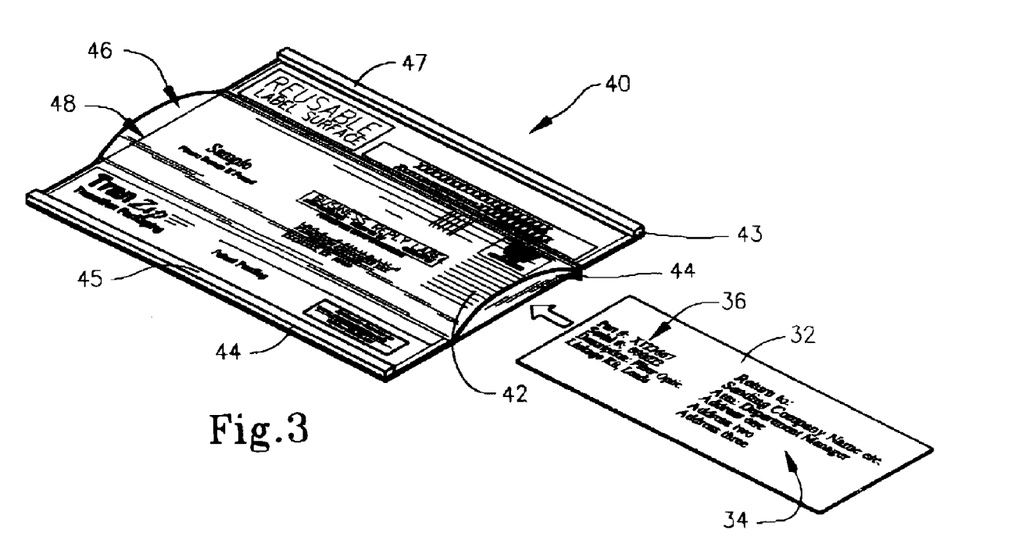
FIG. 3 is a perspective view showing the labeling construction in a return address label receiving state.
Figure 4:
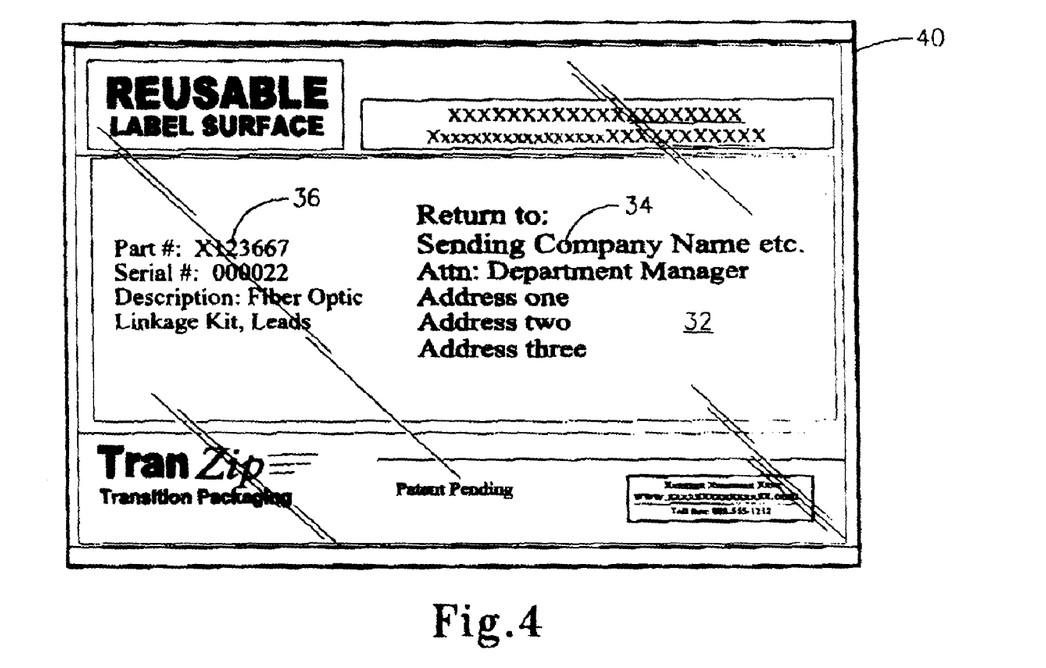
FIG. 4 is a top plan view of the labeling construction after insertion of the return address label.

With reference to FIG. 3 labeling construction 40 is adapted to be placed in a receiving state so that a return address label 32 may be removably inserted. Return address label 32 has indicia 34 corresponding to the sender's return address and may also include other information, such as information 36 identifying the item being shipped. Labeling construction 40 can be manipulated to create a sleeve 42 which is sized to receive the return address label 32 so that, once inserted, the return address label covers the address container's owner as illustrated in FIG. 4. Sleeve 42 has at least one opening 44 which is sized to receive return address label 32. In the exemplary embodiments, sleeve 42 also has an opposed opening 46 so that label 32 may be inserted and removed from either side of the labeling construction 40. Of course, one practiced in the art will recognize that other types of label receiving configurations can be provided without limitation to effectuate the purposes of the invention. Desirably, with any such construction a label would be allowed to be removably received by the labeling construction whereby it is visibly discernable once inserted, while also being somewhat protected during transit. To this end, pocket configurations having a closed end, slits, flaps and the like are contemplated.

Figure 5:
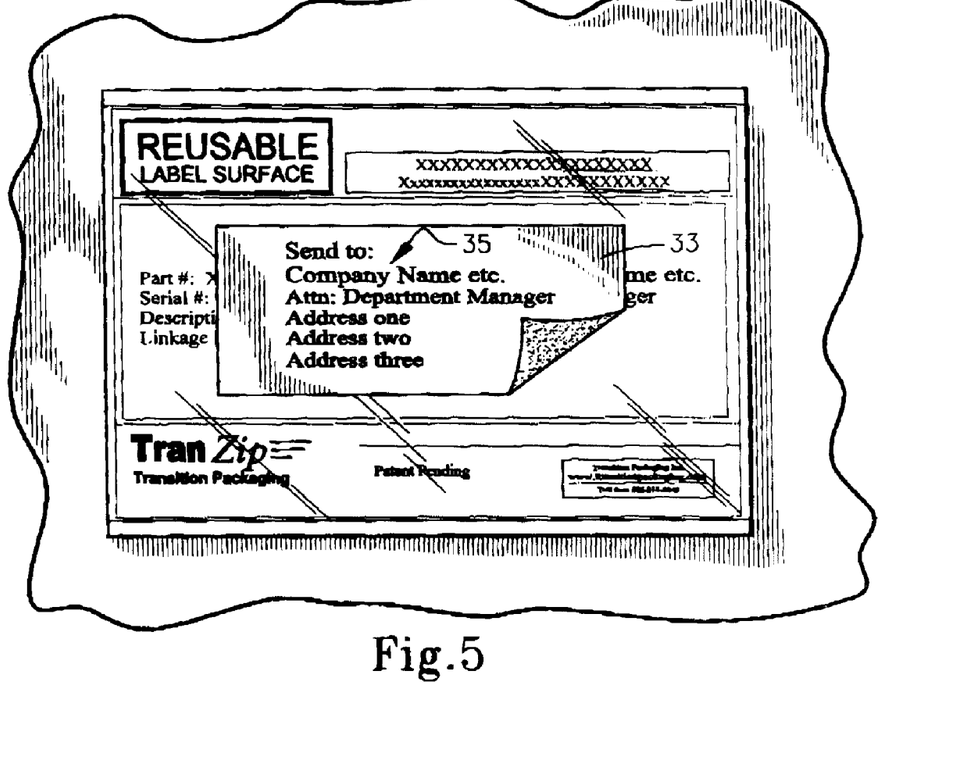
FIG. 5 is a top plan view of the labeling construction after receipt of both the outbound and return address labels.

Once the label 32 is inserted, labeling construction resumes its flattened configuration to retain the label 32 in a compact, snug manner. Labeling construction 40 has at least the overlaying portion of its sleeve 48 (formed by the ensemble of layers 72, 73 & 80 described in below subsequent figures) formed of a transparent material to create a window for viewing return address label 32. Once the return address label 32 is inserted, a sender applies a conventional outbound address label to the exposed surface of sleeve 48, as shown in FIG. 5, wherein the outbound address label 33 is provided with indicia 35 corresponding to the recipient's address. Label 33 is formed as a strip of selected strip material provided with a suitable adhesive that is adapted to adhere to the sleeve's exposed surface. To this end, the exposed surface is coated with or formed from a release material, such as polytetrafluoroethylene or other suitable material, so that label 35 will adhere sufficiently to the window during transit, yet be peeled away. Advantageously, this capability permits easy removal of conventional paper labels from the labeling constructions window 48 without disrupting the ability to discern return address labels therethrough, thus allowing the container and its associated labeling construction to be reused numerous times.

Another aspect of the labeling construction 40 which can be appreciated from FIG. 3 is aimed at protecting the construction and its applied labels during transit. Generally speaking, part of labeling construction 40 has a raised construction which, in the preferred embodiments, is formed by a pair of opposed upstanding rails 41 and 43 which project above the labeling surfaces. As such upper surfaces 45 and 47, respectively, of these rails are elevated relative to other portions of the labeling construction 40 so that, during transit, they can help prevent damage to the labeling construction and its associated labels by providing a protective barrier when the container is handled, placed in a stack with other items, etc.

Figure 6A:
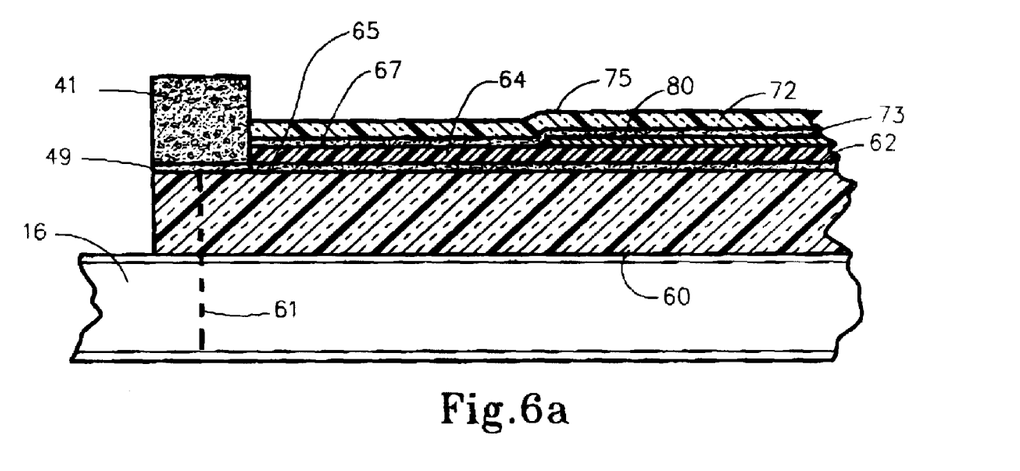
FIG. 6a is an partial cross-section (not to scale) of the labeling construction and the flexible pouch as generally viewed about line 6a—6a in FIG. 2.
Figure 6B:
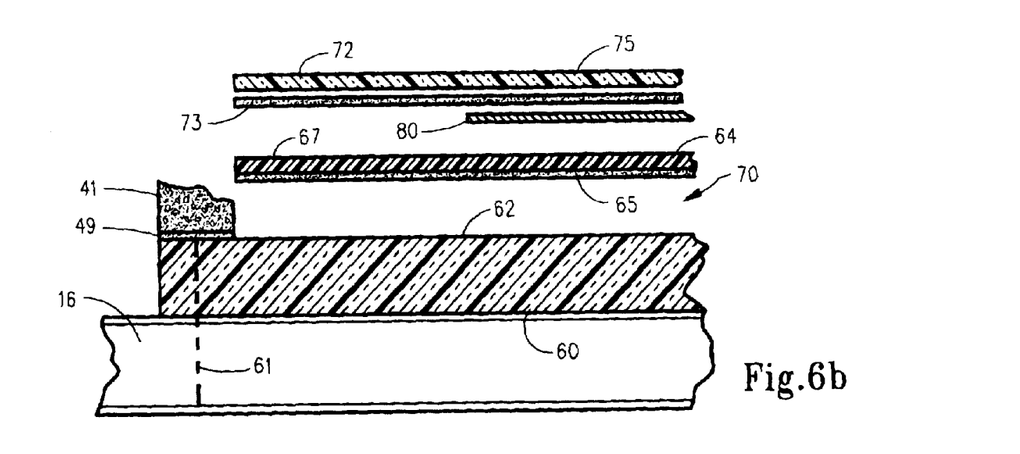
Figure 6C:
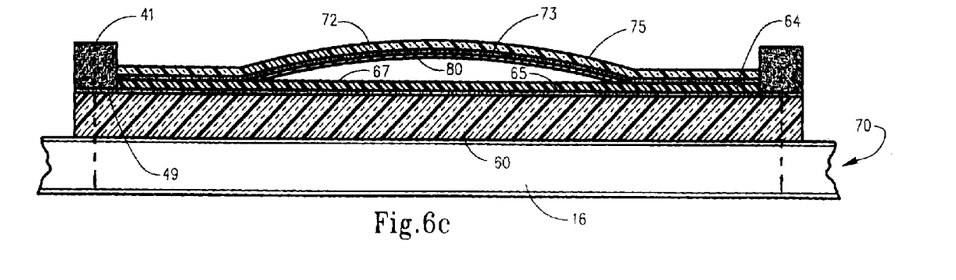
FIG. 6c is an partial cross-section (not to scale) of the labeling construction in the return address label receiving state of FIG. 3.

Having described the capabilities of the labeling construction in FIGS. 1–5, the particulars of its construction are now described with reference to FIGS. 6a–6c. The construction itself measures approximately 6"×9" but can, of course, be of any suitable size depending on the environment of its use. A label substrate 60 is directly supported by a body of the container, such as front panel 16, to which it may be secured by stitching 61. In its exemplary form, base substrate 60 is a 10 mil clear plastic vinyl. Adhered to a margin of the substrate's upper surface 62 are the rails 41 and 43. From the viewpoint, for example, of FIG. 2 rails 41 and 43 are disposed on opposed, longitudinally extending margins of base substrate 60. Each rail is secured to the substrate 60 by a suitable permanent adhesive layer 49 so that they will not become removed or dislodged during typical shipping situations.

Figure 7A:
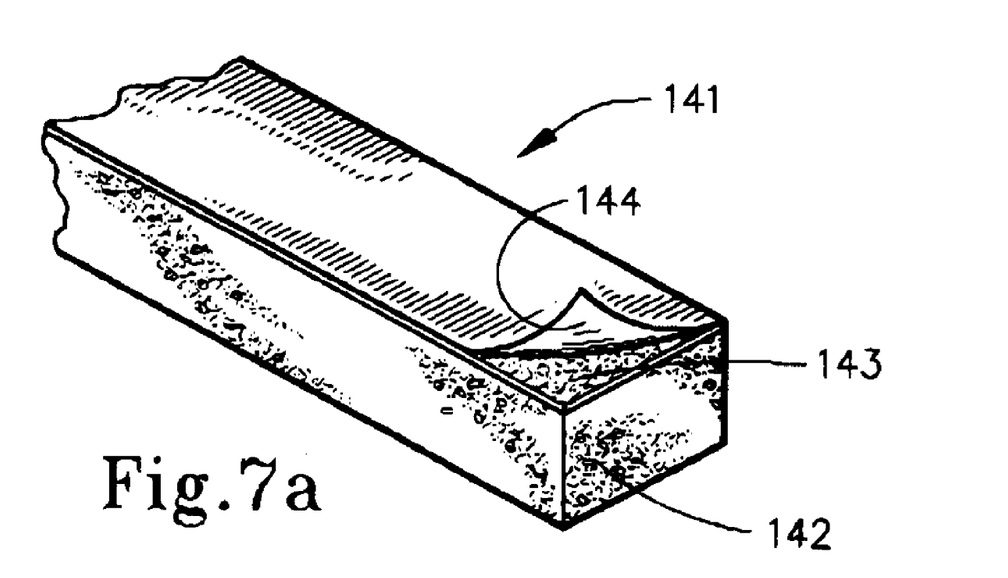
FIGS. 7a–7c show alternatives configurations for the labeling construction's upstanding rails.
Figure 7B:
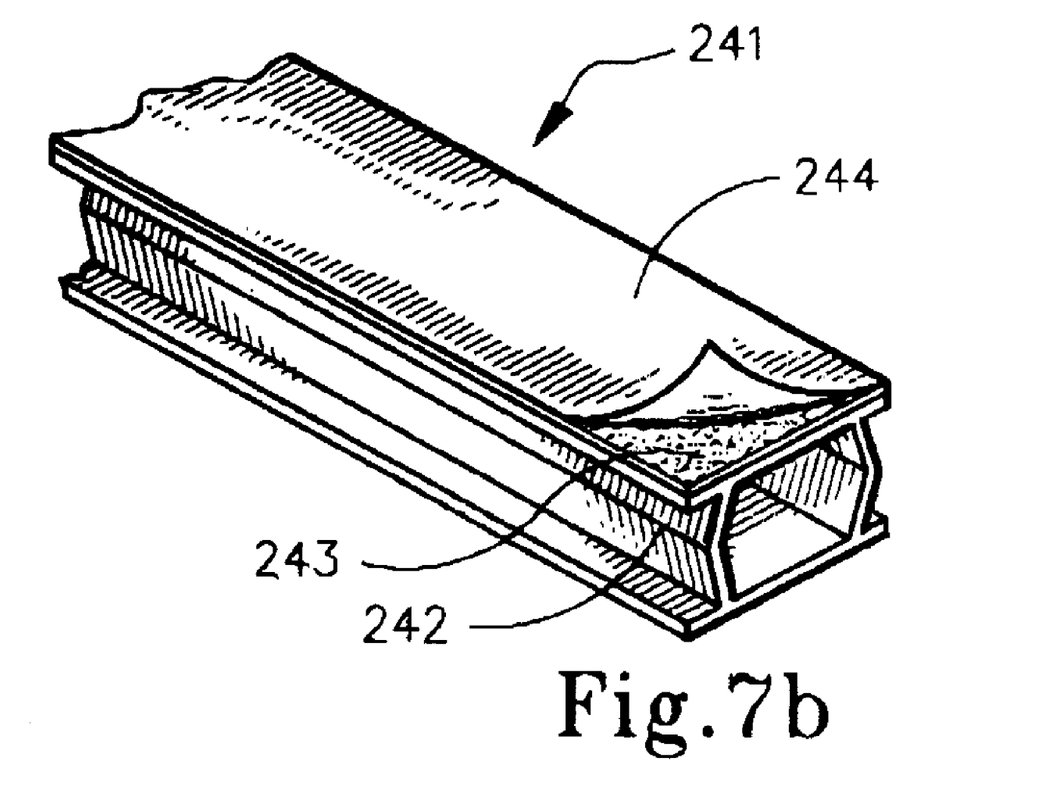
Figure 7C:
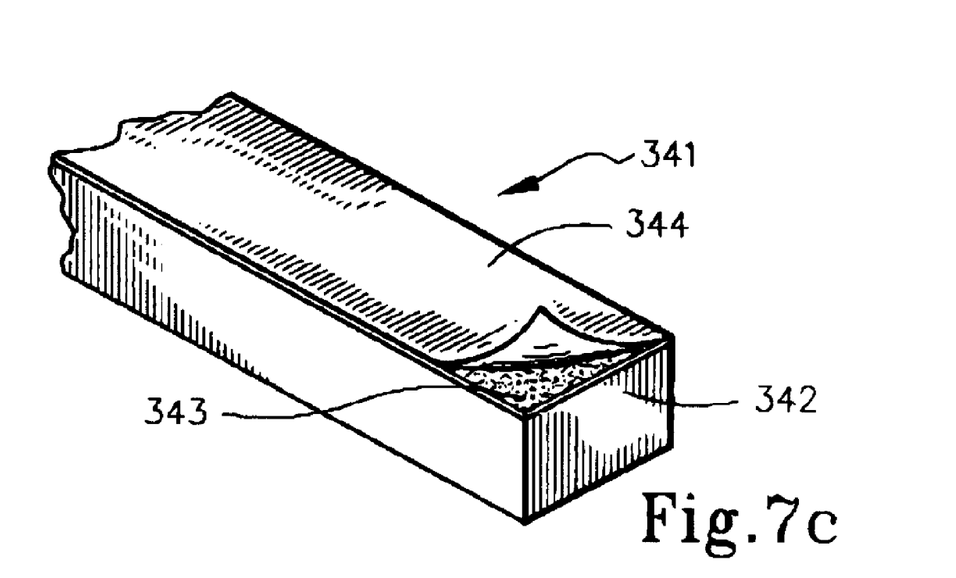

With brief reference to FIGS. 7a–7c the rails can be of a variety of constructions to provide these benefits. Thus, for example, a representative rail 141 in FIG. 7a could be a rubberized foam-based material 142 that is backed with a double-sided adhesive 143 upon which a peel away backing 144 is disposed to expose the adhesive and allow rail 141 to be affixed to the substrate. Alternatively, one or all of the rails could be formed as a corrugated plastic strip 241 in FIG. 7b which is also provided with an associated adhesive 243 and peel away backing 244. Alternatively still, and as shown in FIG. 7c, each rail 341 could be formed from polycarbonate plastic bars 342 with a double-sided tape backing 343 and peel away surface 344. Such material is available as part 04-402 from Rowmark Corporation, Findley, Ohio.

Returning to FIGS. 6a–6c, an overlay 64 is secured in facing relationship to substrate 60, preferably via a permanent adhesive layer 65. Overlay 64 has a reduced transverse dimension relative to base substrate 60 so that it is disposed within the bounds of rails 41 and 43. Overlay 64 measures approximately 2 mils with a 1 mil layer of the adhesive 65 sandwiched between it and the substrate 60. Preferably, overlay 64 is a piece of opaque white plastic to which the printed indicia 50 (FIG. 2) is permanently applied through known printing techniques. Such a material along with its adhesive layer 65 is available as item 2 mil Coated Polyester from the Gerber Scientific Products Corporation, South Windsor, Conn. and comes with removable backing (not shown). Together, the overlay 64 and the substrate 60 to which it is secured form a label panel 70. If desired, an alternative construction for the label panel 70 may be that which is described in my co-pending application Ser. No. 10/298,145 referred to above.

Secured along portions of the overlay's upper surface 67 is a transparent overlay 72 which is coated with a layer of clear, permanent adhesive 73. The transparent layer 72 and 73 are preferably dimensioned the same as the pre-printed opaque layer 64 and its associated adhesive 65. Thus, clear adhesive 73 preferably coats the entire lower surface of transparent layer 72. The upper surface 75 of transparent layer 72 is of the release material so that the outbound label can be removably attached to it.

Extending longitudinally along a medial portion of transparent overlay 72, and secured to adhesive 73, is a transparent panel 80 of reduced dimension. Thus, as may be appreciated with reference to FIG. 6c when the labeling construction is assembled the upper and lower margins of second overlay 72 remain secured to the upper surface 67 of overlay 64 by virtue of the exposed adhesive 73, while the medial portion is unsecured to the layer 64 as a result of the interfacing panel 80. This allows the ensemble of components 72, 73 and 80 to be manipulated to create the sleeve opening discussed above. It can also be appreciated that, since each of layers 72, 73 and 80 are transparent the owner's pre-printed permanent address can be viewed through the window created by them when the return label is removed.

Figure 8:
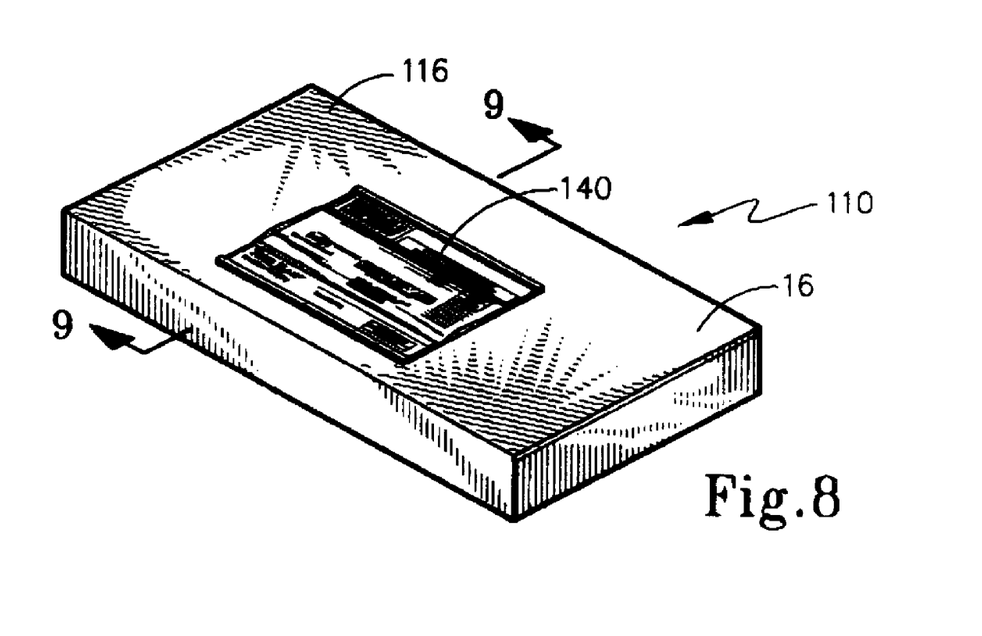
FIG. 8 is a perspective view of a semi-rigid container, namely a corrugated box, provided with a second embodiment of a reusable labeling construction.
Figure 9:
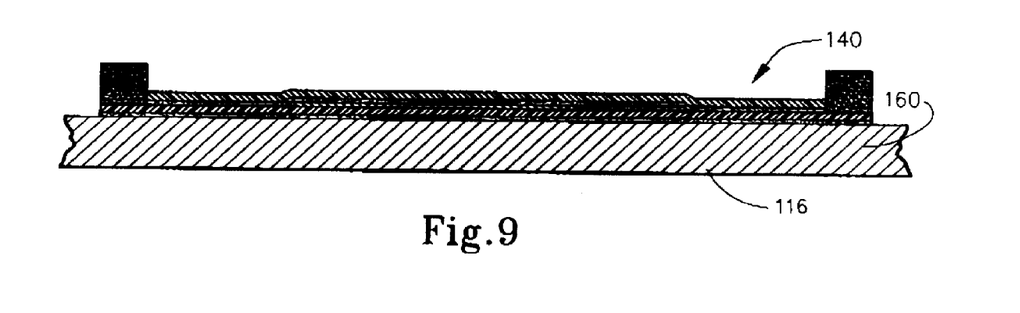
FIG. 9 is a side view in cross section of the labeling construction and container as viewed about lines 9—9 in FIG. 8.

A second exemplary embodiment for a container and its associated second labeling construction embodiment is shown in FIGS. 8 and 9. Here, container 110 is shown as a conventional box construction formed of a suitable material, such as cardboard or the like, so that it is constructed to be more stiff and rigid as compared to the flexible pouch container above. Here, one of the container's box panels, such as upper panel 116, actually forms the base substrate 160 to which is applied, for example, rails 141, 143 as well as layers 64, 65, 72, 73 and 80 discussed above. Thus, aside from the box's panel forming the substrate, in all other respects the labeling construction 140 for container 110 is as described above.

With the above description in mind, the artisan will recognize that at least a method is also contemplated for preparing a parcel for shipment from a sender, located at an origin location, to an intended recipient, located at a destination location. In accordance with such a methodology, preparation of the shipping container may entail, among other aspects, the removable placement of a return address label within a labeling construction that preferably having a raised protective portion, and the removable placement of an outbound address label in a facing relationship to the return address label, whereby a transparent window is interposed between the two labels. A parcel is placed in the container and the container is closed to provide a prepared shipping container.

In addition to a method for preparing a shipping container, the invention also contemplates a shipping method whereby such a prepared container is transmitted to the intended recipient who removes the outbound label and returns the package to the original sender who's address is revealed through the transparent window of the labeling construction. Of course, the ordinarily skilled artisan will recognize that additional aspects of each of these methodologies, as well as other methodologies, are inherent from the description.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A reusable labeling construction for use with a container that is adapted to receive a parcel for shipment from a sender to an intended recipient, comprising;
   a. a base substrate for securing to the container;
   b. said sleeve having a sleeve opening for receiving a return address a sleeve overlaying at least a portion of said base substrate, label that includes return address indicia corresponding to the sender, and a transparent viewing window having an exposed surface for removably receiving an outbound address label, and
   c. an elevated barrier projecting above said sleeve for protecting said labeling construction during transit.

2. A reusable Labeling construction according to claim 1 wherein said barrier projects above said base substrate.

* * * * *

UNITED STATES PATENT AND TRADEMARK OFFICE
CERTIFICATE OF CORRECTION

PATENT NO. : 7,155,854 B2 Page 1 of 1
APPLICATION NO. : 11/160529
DATED : January 2, 2007
INVENTOR(S) : Kent H. Dickinson It is certified that error appears in the above-identified patent and that said Letters Patent is hereby corrected as shown below:

Column 6, line 42 to 47 "said sleeve having a sleeve opening for receiving return address a sleeve overlaying at least a portion of said base substrate, label that includes return address indicia corresponding to the sender, and a transparent viewing window having an exposed surface for removably receiving an outbound address label, and;" should read --a sleeve overlaying at least a portion of said base substrate, said sleeve having a sleeve opening for receiving a return address label that includes return address indicia corresponding to the sender, and a transparent viewing window having an exposed surface for removably receiving an outbound address label; and--

Signed and Sealed this

Nineteenth Day of June, 2007

JON W. DUDAS
*Director of the United States Patent and Trademark Office*